March 12, 1968     C. T. WATTS, JR     3,372,959
GROUSER FOR TRACTOR
Filed Aug. 5, 1966
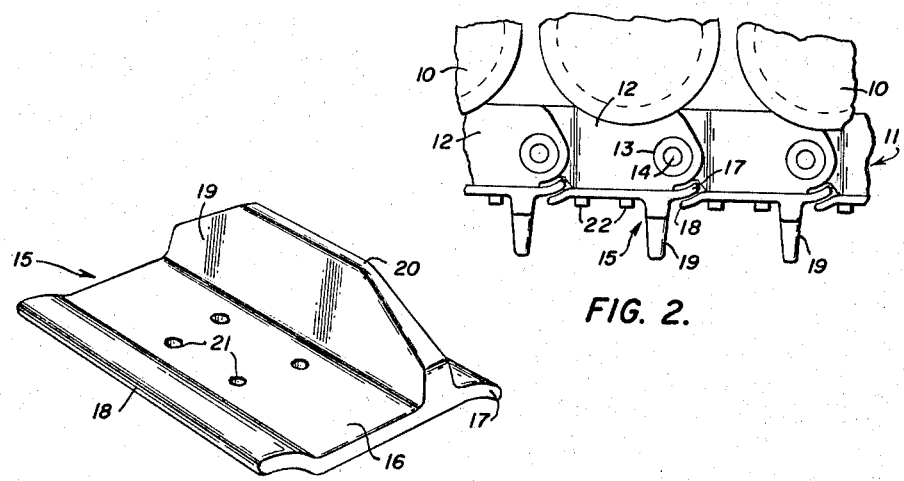
FIG. 1.
FIG. 2.
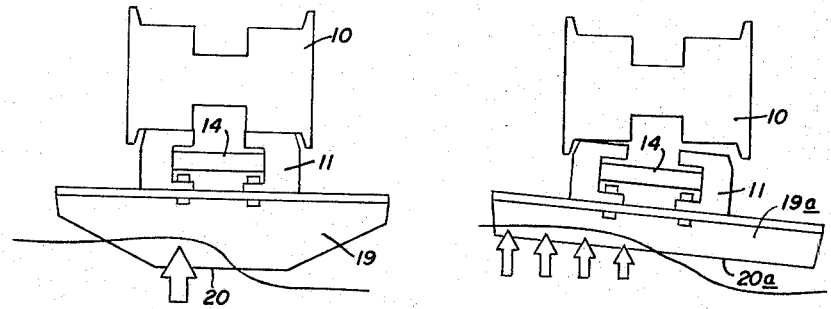
FIG. 3.
PRIOR ART
FIG. 4.
CLEAL T. WATTS JR.
INVENTOR.
BY
ATTORNEY

United States Patent Office 3,372,959
Patented Mar. 12, 1968

3,372,959
GROUSER FOR TRACTOR
Cleal T. Watts, Jr., Russellville, Ark.
(2823 Olive, Texarkana, Tex. 75501)
Filed Aug. 5, 1966, Ser. No. 570,521
1 Claim. (Cl. 305—54)

ABSTRACT OF THE DISCLOSURE

A grouser for a crawler type tractor having endless tracks and wherein each track includes spaced parallel chains on which supporting wheels roll inwardly of the sides of each track. The invention is directed to grouser bars extending across plates which comprise the track and which bars are beveled so as to provide horizontal ground edges less than the widths of the parallel chains.

---

This invention relates to crawler type tractors and has reference to improvements in grousers therefor.

The undercarriage of a crawler type tractor is generally comprised of a pair of endless tracks supported on flanged wheels, and each track includes a pair of endless chains having grousers or track shoes transversely mounted thereon. The weight of the tractor is carried by the lower wheels which are in rolling contact with the upper edges of the links making up the chains. Each grouser has an integral bar projecting outwardly and transversely with reference to the length of the track for engagement with the ground. Particularly, the grouser bars are for penetration of the ground for lending traction to the tracks which are power driven for propelling the tractor forward, backward and for turning. When turning the tractor, the track on one side is reversed relative to the track on the other. By reason of the spaced relation of the chains in each track in conventional constructions, uneven terrain applies uneven pressure on the chains and on the wheels causing undue wear on one chain or the other. Similarly, such unlevel footing causes unequal wear of the wheels and undue wear on the ends of the grouser bars.

The primary object of the invention is to provide a grouser which will apply substantially balanced loads along the wheel supporting lengths of the parallel track chains.

Another object is to provide grousers for crawler type tractor grousers which are less subject to wear when turning the tractor.

A further object is to provide a grouser construction providing substantially uniform floatation, thereby reducing wear in the tractor's undercarriage.

A still further object is to provide an improved grouser bar shaped to provide better traction.

These and other objects of the invention will become apparent from the following description and the accompanying drawing, in which:

FIGURE 1 is a perspective view of a crawler type tractor grouser according to the invention.

FIGURE 2 is a broken side elevational view of the lower portion of a tractor undercarriage and showing grousers according to the invention in place.

FIGURE 3 is a transverse schematic view of the lower portion of a tractor undercarriage and showing the present grouser in contact with and penetrating uneven terrain, and FIGURE 4 is a schematic view similar to FIGURE 3 but illustrating a conventional grouser in contact with uneven terrain and showing the resulting tilting action.

That part of the tractor undercarriage shown includes a row of lower supporting flanged wheels 10 for rolling on the top of vertically disposed endless chains 11. Each track includes two such chains 11 in spaced parallel relation, which chains are comprised of links 12 having bushings 13 in their ends. Pins 14 are pivotally mounted in bushings 13 and extend from one chain 11 to the other.

A grouser 15 according to the invention consists, primarily, of a heavy rectangular cast steel plate 16 having an upturned portion 17 across one end and a downwardly turned portion 18 across the other end whereby, in assembly, the ends of the plates overlap. Across each plate 16 there is an integral grouser bar 19, the ends of which are beveled a distance so as to leave the remaining projecting ground engaging edge 20 a length substantially equal to the width of the two parallel chains 11. Preferably, the grouser bar 19 extends farther from the plate 16 than grouser bars of conventional design for deeper penetration. As is illustrated in FIGURE 3 the grouser bar has a height at the central portion thereof of at least one-half the center width of the side links and is also at least one-sixth of the total width of said tread plate 16. The beveled edges 20 begin at each upright end of the grouser bar at a point substantially one-third the height of the grouser bar at the central portion thereof as also clearly illustrated in FIGURE 3. The plate 16 has drilled holes 21 for attaching the grousers 15 to the chains 11 by bolts 22. The lower edges of the links 14 are inwardly flanged for receiving the bolts 22, and the upper edges are also inwardly flanged to provide a wide bearing area for the wheels 10.

Referring now to FIGURE 3, the irregular line shown represents irregular terrain and the arrow represents a line of relative force at one end of the extending edge 20 of the grouser bar 19. Because the extending edge 20 of the grouser bar 19 is of substantially the same length as the width of the two parallel chains 11, the transmitted relative force does not cause the grousers 15 to tilt.

In FIGURE 4 all parts shown are the same as FIGURE 3 except the length of the extending edge 20a of the conventional grouser bar 19a is longer than the width of the chains 11. Thus, on uneven terrain, the relative force indicated by the arrows is outwardly of the width of the parallel chains 11 and causes the grousers to tilt. Such tilting puts points of pressure on corresponding wheels 10 on one side of the track which, in turn, causes undue wear around the wheels and the upper outer edges of the links 14. Moreover, such tilting causes undue wear near the ends of the pins. By reason of the described shape of the described beveled grouser bar 19, turning the tractor does not apply as much resistance at the ends of the bars as the conventional bars 19a.

The invention is not limited to the exemplary construction herein shown and described, but may be made in various ways within the scope of the appended claim.

What is claimed is:

1. A grouser for a crawler type tractor having driven endless tracks and wherein each said track includes spaced parallel side links on which supporting wheels of the tractor roll, said grouser being comprised of a rectangular plate removably attached to and extending outwardly of the sides of said links, and a depending grouser bar integral with and extending substantially entirely across said plate transversely of the length of said track, said bar having upright ends and a ground engaging central edge portion of a width which is approximately the width of said side links, the height of said bar between said side links being at least one-half the center width of said side links and at least one-sixth the total width of said tread plate, a beveled surface connecting said upright ends and said ground engaging central portion, the beveled edges beginning at each said upright end at a point substantially one-third the height of said grouser bar at said central portion, whereby each link is adapted to resist tilting with respect to track rollers for supporting the links.

References Cited

UNITED STATES PATENTS

| | | | |
|---|---|---|---|
| 2,393,336 | 1/1946 | Myers | 305—54 |
| 1,704,857 | 3/1929 | Hennewse | 305—53 X |
| 2,982,585 | 5/1961 | Murtaugh | 305—54 |

FOREIGN PATENTS 82,544  10/1919  Switzerland.

OTHER REFERENCES

Brochure: The Development of Track Equipment for Snow and Ice Conditions published by Caterpillar Tractor Co., Peoria, Ill., p. 6.

RICHARD J. JOHNSON, *Primary Examiner*.